United States Patent

Macpherson et al.

[11] Patent Number: 5,759,254
[45] Date of Patent: Jun. 2, 1998

[54] SUBSTITUTED PHTHALOCYANINES

[75] Inventors: Ian Alexander Macpherson, Paisley; Iain Frank Fraser, Kilbirnie; Sharon Kathleen Wilson, Paisley, all of Scotland

[73] Assignee: Ciba Specialty Chemicals Corporation, Tarrytown, N.Y.

[21] Appl. No.: 683,445

[22] Filed: Jul. 18, 1996

[51] Int. Cl.$^6$ ................................................ C09B 67/50
[52] U.S. Cl. ................... 106/410; 8/661; 106/31.13; 106/31.6; 106/31.78; 106/31.49; 106/411; 106/413; 502/163; 508/296; 540/122; 540/135; 540/136; 540/137; 540/139; 540/140
[58] Field of Search ................... 106/31.13, 31.6, 106/31.78, 31.49, 410, 411, 413; 8/661; 540/122, 135, 136, 137, 139, 140; 502/163; 508/296; 524/88

[56] References Cited

U.S. PATENT DOCUMENTS

| | | | |
|---|---|---|---|
| 3,920,469 | 11/1975 | Kienzle et al. | 106/411 |
| 3,981,734 | 9/1976 | Cabut et al. | 106/411 |
| 5,079,135 | 1/1992 | Matsuzawa et al. | 430/495 |
| 5,282,894 | 2/1994 | Albert et al. | 106/31.64 |
| 5,476,544 | 12/1995 | Endo et al. | 106/411 |

FOREIGN PATENT DOCUMENTS

| | | |
|---|---|---|
| 0420613 | 4/1991 | European Pat. Off. |
| 0553614 | 8/1993 | European Pat. Off. |
| 0607031 | 7/1994 | European Pat. Off. |
| 0663429 | 7/1995 | European Pat. Off. |

*Primary Examiner*—Mark L. Bell
*Assistant Examiner*—Scott L. Hertzog
*Attorney, Agent, or Firm*—Kevin T. Mansfield

[57] ABSTRACT

The present invention provides a phthalocyanine of Formula (1):

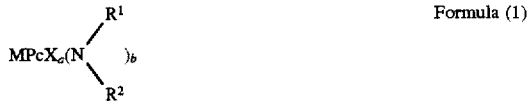

wherein:

MPc is a phthalocyanine nucleus of Formula (2);

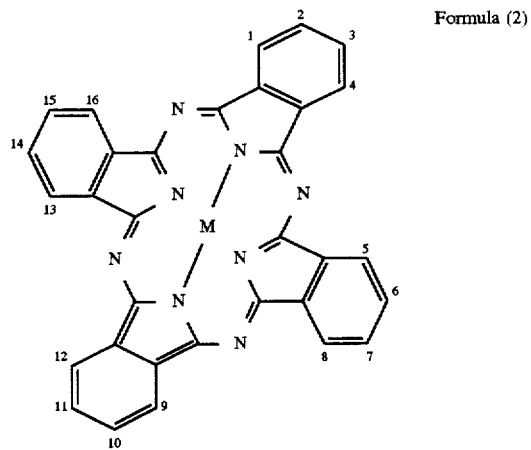

in which

M is a metal atom, a chloro-metal group, an oxy-metal group or hydrogen
X is halogen
$R^1$ is an benzylamino or N-alkyl aminoalkyl
$R^2$ is H or an optionally substituted alkyl
a has an average value from 15 to 8
b has an average value from 1 to 8
a+b is from 4 to 16.

11 Claims, No Drawings

SUBSTITUTED PHTHALOCYANINES

The present invention relates to phthalocyanine pigments which absorb in the near IR region.

Accordingly the present invention provides a phthalocyanine of Formula (1):

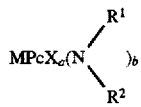

Formula (1)

wherein: a

MPc is a phthalocyanine nucleus of Formula (2);

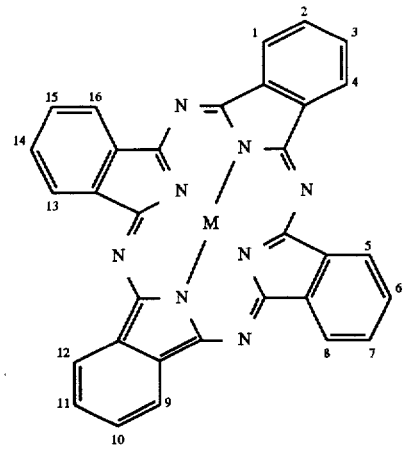

Formula (2)

in which

M is a metal atom, a chloro-metal group, an oxy-metal group or hydrogen

X is halogen $R^1$ is an organic radical $R^2$ is H or an optionally substituted alkyl a has an average value from 15 to 1 b has an average value from 1 to 15 a+b is from 4 to 16

Preferred phthalocyanines of the present invention are those which have a maximum absorbance ($\lambda$ max) from 700 to 1000 nm.

The phthalocyanine nucleus may be metal free i.e. M is hydrogen, or M may be a metal, a halo-metal group or an oxy-metal group. Suitable metals, halo-metal groups and oxy-metal groups are those of Groups IA, IIA, IIIB, IVB, those of the 1st, 2nd and 3rd transition metals and the lanthanide series of the periodic table. Preferred metals, halo-metal groups and oxy-metal groups are those in which the metal is selected from copper, manganese, iron, zinc and cobalt and especially copper.

In halo-metal groups suitable halo atoms are —Cl, —F, —Br and —I preferably —Cl, —F and —Br.

In oxy-metal groups the oxy is oxygen or hydroxy.

It is preferred that $R^1$ is selected from aryl, heterocyclic, alicyclic and alkyl radicals and is optionally substituted by one or more substituents. Where $R^1$ is an aryl or a heterocyclic radical it is preferably selected from mono- or bi-cyclic aryl or heterocyclic radicals. Examples of suitable aryl or heterocyclic radicals are phenyl naphthyl, pyridyl, quinolinyl, thienyl, furanyl, thiazolyl and benzothiazolyl. Where $R^1$ is an alicyclic radical it is preferably $C_{4-8}$-cycloalkyl, more preferably cyclohexyl. Where $R^1$ or $R^2$ is an alkyl radical it is preferred that each independently is $C_{1-10}$-alkyl, more preferably C1-6-alkyl and especially $C_{1-4}$-alkyl.

Where the organic radical represented by $R^1$ is optionally substituted the substituents are selected from $C_{1-10}$-alkyl, preferably $C_{1-6}$-alkyl, C1–10-alkoxy, preferably C1–6-alkoxy, —CNNO$_2$, —CF$_3$, halogen, preferably —F, —Cl or Br, —NR$^3$R$^4$, —OR$^3$, —SO$_2$NR$^3$R$^4$, -SO$_2$R$^3$, -CONR$^3$R$^4$-CONR$^3$R$^4$, —COOR$^3$, —COR$^3$ in which R$^3$ and R$^4$ each independently is selected from -H, $C_{1-6}$- alkyl, aryl, preferably phenyl and $C_{7-10}$- aralkyl preferably benzyl. Especially preferred substituents for the organic radical represented by $R^1$ are $C_{1-6}$-alkyl, —OR$^3$, in which R$^3$ is $C_{1-6}$-alkyl, [NH(CH$_2$)$_x$]$_y$ NH(CH$_2$)$_n$H in which x is 2 or 3, y is 0 to 5 and n is 0 to 24 or —NR$^3$R$^4$ in which R$^3$ and R$^4$ each independently is —H, $C_{1-6}$-alkyl, phenyl or $C_{7-10}$-aralkyl.

Where $R^2$ represents optionally substituted alkyl the substituents are selected from —OH, halogen, preferably —Cl, —Br, or —F, —CN, —COOC$_{1-6}$-alkyl and phenyl.

Preferred compounds of Formula (1) are those in which M is Cu, $R^1$ is benzyl or N-alkylaminoalkyl, $R^2$ is H, and a+b is from 12 to 16.

More preferred are compounds in which M is Cu, $R^1$ is benzyl or N-alkylaminoalkyl, $R^2$ is H, a is from 15 to 8 and b is from 1 to 8. Thus a+b may be from 15 to 16.

Especially preferred compounds of Formula (1) are octachlorohepta(benzylamino) copper phthalocyanine, and undecachloro-tetra(N-stearyl-3-propanediamino) copper phthalocyanine.

According to a further feature of the present invention there is provided a process for the preparation of a phthalocyanine of Formula (1):

Formula (1)

by reaction of a phthalocyanine of Formula (3):

MPcX$_c$

Formula 3 with a compound of Formula (4):

H—NR$^1$R$^2$

Formula 4 in which c is from 4 to 16 e.g. from 15 to 16; and M, Pc, X, $R^1$, and $R^2$ are as hereinbefore defined.

The process may be performed by mixing the phthalocyanine of Formula (3) and the compound of Formula (4), optionally in the presence of an inert liquid, and heating at an elevated temperature.

Suitable inert liquids are amides such as N-methylpyrrolidone or dimethylformamide.

The process is preferably performed in the absence of the inert liquid.

The process is preferably performed at a temperature of from 100° C. to 250° C., more preferably at a temperature of from 130° C. to 200° C. and especially at a temperature from 150° C. to 190° C.

The phthalocyanine of Formula (1) may be isolated from the reaction mixture by any convenient means for example by cooling the reaction mixture and pouring it into a liquid such as ethanol and filtering off the precipitated product. The product may be purified by washing with a liquid such as ethanol or by elution from silica using a liquid such as toluene as eluent.

The compound of Formula (3) may be prepared by reacting a halogenated-1,2-dicyanobenzene e.g. a tetrahalo-1,2-dicyanobenzene, with an appropriate metal or metal salt in an inert organic liquid at an elevated temperature.

The phthalocyanines of the present invention are useful for absorbing electromagnetic radiation from for example a laser source and may be used in a coating for optical data storage disks.

The pigment of the invention may be a constituent of a printing ink which may be designed for use by lithography, letterpress printing, intaglio printing or screen printing. The ink may contain the pigment in an amount of from 0.1 to 20%, preferably 1 to 15% by weight. The ink may contain other components such as driers and other pigments.

The present invention also comprises an ink containing an ink vehicle and a pigment of the invention.

Inks of the invention may be printed on security documents and other items which need to be authenticated. In this context, the substrates used for printing are generally paper, including rag paper, preferably currency-grade paper, plastics-coated or laminated paper, and plastics such as, for example, bankcard-grade PVC, or plastic paper, e.g. non woven plastic paper. Articles bearing security printing include banknotes, banknote thread, currency, travellers' cheques, bonds, certificates, stamps, lottery tickets, ownership documents, passports, identity cards, credit cards, charge cards, access cards, smart cards, brand authencation labels and tags, and tamperproof labels.

Security documents normally have different types of printing present selected from intaglio, offset lithographic, letterpress printing and occasionally gravure. An ink of the invention will normally be used in addition to/beside security-printed areas in a variety of colours. Rainbow-printing techniques are often used in security documents. The pigment of the invention may also be included in electro-photographic toners, matrix or daisy-wheel printer inks, and non-impact printing methods.

The pigment of the invention may also be included, not necessarily as inks, in paper including rag papers and plastic papers, banknote threads, plastic cards and other security documents or items which need to be authenticated, if necessary blended with a polymer and bonded other than in an ink. The pigment of the invention may be deposited in a single area or a series of areas, if necessary or desired in a coded pattern.

The pigment may be incorporated into items which need to be authenticated e.g. by incorporating it in a label such as a holographic label bearing printing, or in a hot-stamping foil construction. In general, the pigment may be on or near the surface of the item to be authenticated.

The intention is further illustrated by the following examples:

EXAMPLE 1 Preparation of octachlorohepta (benzylamino) copper phthalocyanine Benzylamine (25 parts) and Pigment Green 7 (1 part) are refluxed for 4 hours. The reaction mixture is then cooled and poured into water. The resulting precipitate is collected via centrifugation, washed with water and dried at room temperature to give a product having $\lambda$ max (CHCl$_3$) 714 nm.

EXAMPLE 2 Preparation of undecachloro-tetra(N-stearyl-1,3-propanediamino) copper phthalocyanine N-stearyl -1,3-diaminopropane (11.4 parts) and Pigment Green 7 (1 part) are refluxed for 18 hours. The reaction mixture is cooled and poured into glacial acetic acid. The resulting precipitate is collected via centrifugation, washed with glacial acetic acid until the washings become clear, then washed with water and dried at room temperature to give a product having $\lambda$max (1-methylnaphthalene) 723.2 nm.

EXAMPLE 3

The pigment of Example 1 is dispersed into a clear offset ink varnish at a level of 10% (by weight) using a triple roll mill and prints are obtained using a laboratory proofing press. The prints are analysed using a UV-VIS-NIR spectrophotometer. A minimum reflectance (maximum absorption) is observed at 720 nm.

EXAMPLE 4

The pigment of Example 2 is dispersed into a clear offset ink varnish at a level of 3% (by weight) using a triple roll mill and prints are obtained using a laboratory proofing press. The prints are analysed using a UV-VIS-NIR spectrophotometer. A minimum reflectance (maximum absorption) is observed at 715 nm.

We claim:

1. A phthalocyanine of Formula (1):

$$MPcX_a(N{\overset{R^1}{\underset{R^2}{<}}})_b \quad \text{Formula (1)}$$

wherein:

MPc is a phthalocyanine neucleus of Formula (2);

Formula (2)

in which

M is a metal atom, a chloro-metal group, an oxy-metal group or hydrogen

X is halogen $R^1$ is benzyl or N-alkylaminoalkyl $R^2$ is H or an optionally substituted alkyl a has an average value from 15 to 1 b has an average value from 1 to 15 a+b is from 4 to 16.

2. A compound as claimed in claim 1 in which M is hydrogen, copper, manganese, iron, zinc, or cobalt.

3. A compound as claimed in claim 1 in which M is copper, $R^1$ is benzyl or N-alkylaminoalkyl, and $R^2$ is hydrogen.

4. The compound octachlorohepta (benzylamino) copper phthalocyanine.

5. The compound undecachlorotetra (N-stearyl-1,3-propanediamino) copper phthalocyanine.

6. A process for the preparation of a phthalocyanine of Formula (1):

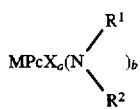 Formula (1)

by reaction of a phthalocyanine of Formula (3):

Formula 3 with a compound of Formula (4):

H—NR$^1$R$^2$

Formula 4 in which c is from 4 to 16; and M, Pc, X, R$^1$, and R$^2$ are as defined in claim 1.

7. A process as claimed in claim 6 in which the reactants are heated at an elevated temperature from 100° to 250° C. in the presence or absence of an inert liquid.

8. A process as claimed in claim 7 which is carried out at a temperature from 150° to 190° C.

9. An ink containing an ink vehicle and a compound as claimed in claim 1.

10. An ink as claimed in claim 9 which contains the said compound in an amount of from 0.1 to 20% by weight.

11. A security document having printing thereon of an ink as claimed in claim 9.

* * * * *